(12) United States Patent
Anttila

(10) Patent No.: US 6,584,510 B2
(45) Date of Patent: *Jun. 24, 2003

(54) COMPUTER AND A METHOD OF OPERATING A COMPUTER

(75) Inventor: Ismo Anttila, Helsinki (FI)

(73) Assignee: Nokia Mobile Phones Ltd., Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,490

(22) Filed: Apr. 17, 1998

(65) Prior Publication Data

US 2001/0037382 A1 Nov. 1, 2001

(30) Foreign Application Priority Data

Apr. 23, 1997 (FI) .................................................. 971747

(51) Int. Cl.⁷ ............................. G06F 3/16; G06F 15/00
(52) U.S. Cl. ........................ 709/250; 709/322; 710/72; 370/313; 379/900
(58) Field of Search .................... 455/418; 370/463, 370/294, 328, 358, 352, 310, 313; 379/90.01, 93.01, 93.05, 93.06, 93.07, 93.08, 93.09, 387.01, 900; 709/250, 322; 710/72

(56) References Cited

U.S. PATENT DOCUMENTS

| | | | | |
|---|---|---|---|---|
| 5,359,698 A | * | 10/1994 | Goldberg et al. | 704/201 |
| 5,463,628 A | * | 10/1995 | Sorensen | 370/110.1 |
| 5,657,371 A | | 8/1997 | Suomi et al. | 455/418 |
| 5,678,059 A | * | 10/1997 | Ramaswamy et al. | 710/1 |
| 5,727,159 A | * | 3/1998 | Kikinis | 709/246 |
| 5,787,152 A | * | 7/1998 | Freadman | 379/110.01 |
| 5,858,137 A | * | 1/1999 | Assaad et al. | 152/451 |
| 5,926,624 A | * | 7/1999 | Katz et al. | 705/27 |
| 5,940,479 A | * | 8/1999 | Guy et al. | 370/410 |
| 5,953,322 A | * | 9/1999 | Kimball | 370/328 |
| 6,011,794 A | * | 1/2000 | Mordowitz et al. | 370/389 |
| 6,047,342 A | * | 4/2000 | Depew | 710/2 |
| 6,141,340 A | * | 10/2000 | Jain | 370/352 |
| 6,141,341 A | * | 10/2000 | Jones et al. | 370/352 |
| 6,157,620 A | * | 12/2000 | Danne et al. | 370/294 |
| 6,167,040 A | * | 12/2000 | Haeggstrom | 370/352 |
| 6,169,734 B1 | * | 1/2001 | Wilson | 370/352 |
| 6,192,255 B1 | * | 2/2001 | Lewis et al. | 455/550 |
| 6,243,376 B1 | * | 6/2001 | Ng et al. | 370/352 |

FOREIGN PATENT DOCUMENTS

| | | |
|---|---|---|
| GB | 2 274 960 A | 8/1994 |
| WO | WO 95/34958 | 12/1995 |

* cited by examiner

Primary Examiner—Dung C. Dinh
(74) Attorney, Agent, or Firm—Perman & Green, LLP

(57) ABSTRACT

A method of operating a computer having an audio device driver (ADD) for driving a soundcard (1), and an application manager (AM) for interfacing the ADD with an audio compression manager (ACM) to facilitate the transfer of uncompressed audio data between the ADD and ACM and for interfacing the ACM with an external data transfer channel (10) to facilitate the transfer of compressed audio data between the ACM and the external data transfer channel (10). The method comprises providing a data transfer manager (DTM) in place of the ACM, the DTM facilitating the transfer of compressed audio data between an external mobile phone (11) and the external data transmission channel (10) via the AM whilst generating dummy control and uncompressed audio data for use by the AM in interfacing with the ADD.

29 Claims, 3 Drawing Sheets

COMPUTER AND A METHOD OF OPERATING A COMPUTER

FIELD OF THE INVENTION

The present invention relates to a method of operating a computer having an audio device driver for driving sound control hardware, and a control application for interfacing the audio device driver and an audio compression manager. The present invention also relates to a computer operating in accordance with such a method.

BACKGROUND OF THE INVENTION

With the advent of multimedia technology, it is now possible to conduct telephone conversations over local or wide area computer networks or even over the internet using personal computers. A number of audio communication programs are available for facilitating such conversations. Examples are NetMeeting™ available from Microsoft Inc, USA, CoolTalk™ from Netscape Inc, USA, and WebPhone™ from NetSpeak Corporation, USA.

In general, audio communication programs are run on personal computers provided with a soundcard 1 and associated microphone 2 and loudspeaker 3. The audio communication program provides an Application Manager (AM) 4 which is interfaced through a Microsoft Windows™ environment (ACM-API) 5 to an Audio Device Driver (ADD) 6 specific to the soundcard being used. This is illustrated in FIG. 1. Windows™ is supplied with a number of 'standard' ADDs from which an operator may make a selection appropriate to the soundcard being used.

The main function of the AM 4 is to provide the user interface, allowing a user to perform tasks such as selecting options and services and initiating and terminating a call. The AM 4 also routes pulse code modulated ($I_{pcm}$ and $O_{pcm}$) audio data between the ADD 6 and an audio coding decoding program 7 generally known as an audio codec or Audio Compression Manager (ACM). The ACM 7 performs audio coding and decoding in accordance with a desired audio protocol to both compress and decompress the data and to transform it into a form suitable for transmission and reception. Compressed data ($I_{net}$ and $O_{net}$) is coupled between the ACM 7 and an external network 10 via the AM 4 and a network protocol stack 8 and a network interface 9. As with the ADD, a number of different audio codecs are usually provided with the final choice being left to the user. Of course, the other party or parties to the communication must also have access to the same codec. Audio codings currently supported by ACMs include GSM, ADPCM, G.711,G.728, G.723.1.

It will be appreciated that the modular structure (4 to 8) of current multimedia applications provides maximum flexibility in terms of hardware and transmission protocols. This flexibility is essential if the multimedia applications are to be usable with a wide range of platforms.

Considering further the interoperation of the software modules in a multimedia application, coded data is passed via the AM 4 from the ACM 7 to a protocol stack 8 which prepares the data for a transfer to the network interface 9. Data is transferred in turn from the network interface 9 to the network transmission channel 10. This transmission channel 10 may be any suitable channel such a land line or an RF wireless connection. In the same way, data received over the transmission channel 10 is passed by the protocol stack 8 via the AM 4 to the ACM 7 for decoding. The decoded data is then passed in pcm form to the ADD 6 to allow the data to be played over the loudspeaker 3 of the soundcard 1.

It has been proposed to replace the soundcard, loudspeaker, and microphone, used for multimedia conversations, with a portable communication device such as a mobile phone coupled to the computer. This generally requires the use in the computer of a dedicated or custom application to interface the phone and the network interface, effectively replacing the AM, ADD, and the ACM described above. If a user wishes to have the choice of using either a soundcard (with associated microphone and loudspeaker) or a portable phone, he must have access to both the custom phone application and the AM/ADD/ACM system.

SUMMARY OF THE INVENTION

It is an object of the present invention to provide a computer in which a single application program can be used with both a soundcard and a mobile communication device.

It is a further object of the invention to reduce the computational requirements required of a computer when using the computer to conduct a mutimedia communication.

According to first aspect of the present invention there is provided a method of operating a computer having an audio device driver (ADD) for driving sound control hardware, and an application manager (AM) for interfacing the ADD with an audio compression manager (ACM) to facilitate the transfer of uncompressed audio data between the ADD and ACM and for interfacing the ACM with an external data transfer channel to facilitate the transfer of compressed audio data between the ACM and the external data transfer channel, the method comprising > providing a data transfer manager (DTM) in place of the ACM, the DTM facilitating the transfer of audio data between an external mobile communication device and the external data transmission channel via the AM whilst generating data for use by the AM in interfacing with the ADD.

The present invention increases the potential for offering low-cost internet (and LAN, WAN) telephone calls as an alternative to relatively expensive cellular network calls.

In one embodiment of the invention, the data generated for use in interfacing with the ADD comprises null audio data for playing through a loudspeaker of the sound control hardware.

In an alternative embodiment, the data generated for use in interfacing with the ADD comprises decoded audio data for playing through a loudspeaker of the sound control hardware, wherein audio data is input from the external mobile communication device and output through said loudspeaker to provide a hands-free communication mode.

Preferably, the DTM receives audio data from the sound control hardware via the AM and subsequently discards this audio data.

The present invention provides two significant benefits to users of multimedia applications. Firstly, the DTM is a 'bolt-on' software driver which appears to the AM as a conventional ACM so that a user can select the DTM in the same way as he has always selected a specific ACM. A single AM may therefore be installed on the users computer for conducting communications with either a soundcard based set-up or with a mobile communication device. This has significant cost, flexibility, and familiarity of use advantages. Memory requirements are also reduced.

A further significant and surprising advantage arises from the present invention. In digital mobile communication devices such as mobile phones, audio coding and decoding is carried out in the device. There is thus no need for the computer to perform coding and decoding operations on the audio data, if the data channel supports the phone supported audio coding, and the coded data and the computer may be substantially transparent to this data saving substantial computational effort on the part of the computer. In general, multimedia applications are extremely computationally intensive and the resulting saving is particularly welcome.

Preferably, the DTM is coupled to the external mobile communication device via a custom phone driver. The custom phone driver adapts a vendor specific phone protocol to a computer input-output protocol. Thus, the DTM is made phone independent.

Preferably, the AM transfers data to and from the external data transfer channel via a network communication protocol stack. The protocol stack provides means for controlling connections and for transferring data over the data transfer channel.

Preferably, said sound control hardware is a soundcard. Alternatively for example, this hardware may be integrated into a computer motherboard.

Preferably, the DTM facilitates the transfer of compressed audio data between the external mobile communication device and the external data transmission channel. In one embodiment of the invention, coded audio data is transferred unmodified between the external phone and the external data transfer channel. However, in other embodiments, the DTM may convert coded data received from the data transfer channel in a first format, e.g. G.711, into a second format, e.g. GSM, for transfer to the phone, and vice versa. This may be referred to as 'transcoding'.

If required by the AM, the DTM may generate, in addition to said blank uncompressed audio data, control signals for use by the AM.

According to a second aspect of the present invention there is provided a computer having an audio device driver (ADD) for driving sound control hardware, and an application manager (AM) for interfacing the ADD with an audio compression manager (ACM) to facilitate the transfer of uncompressed audio data between the ADD and ACM and for interfacing the ACM with an external data transfer channel to facilitate the transfer of compressed audio data between the ACM and the external data transfer channel, the apparatus comprising a data transfer manager (DTM) in place of the ACM, the DTM facilitating the transfer of audio data between an external mobile communication device and the external data transmission channel via the AM whilst generating data for use by the AM in interfacing with the ADD.

According to a third aspect of the present invention there is provided a storage medium containing thereon a computer program for operating a computer, the computer having an audio device driver (ADD) for driving sound control hardware, and an application manager (AM) for interfacing the ADD with an audio compression manager (ACM) to facilitate the transfer of uncompressed audio data between the ADD and ACM and for interfacing the ACM with an external data transfer channel to facilitate the transfer of compressed audio data between the ACM and the external data transfer channel, said computer program providing a data transfer manager (DTM) for replacing the ACM, the DTM facilitating the transfer of audio data between an external mobile communication device and the external data transmission channel via the AM whilst generating data for use by the AM in interfacing with the ADD.

DETAILED DESCRIPTION

Figure 1:
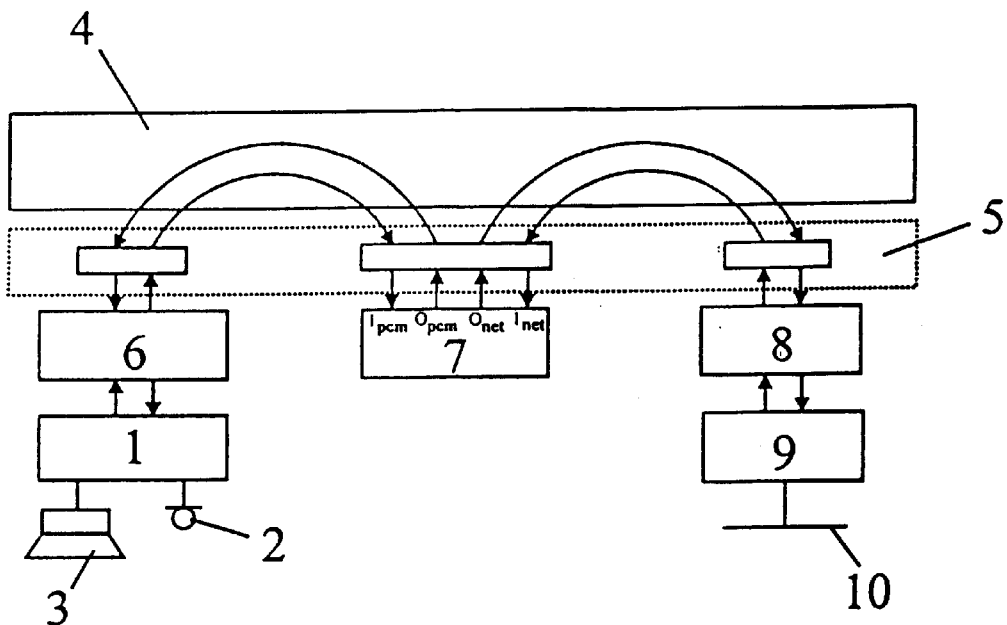
FIG. 1 shows schematically the organisation of a prior art computer program for conducting a multimedia network telephone conversation.
Figure 2:
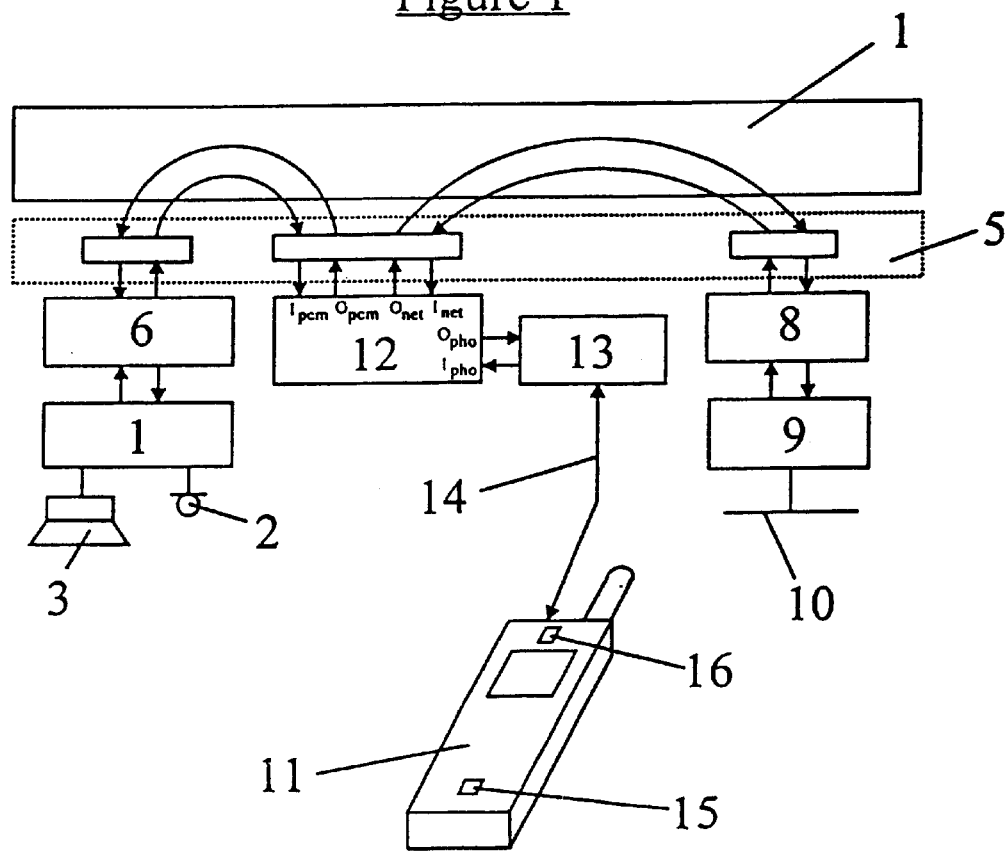
FIG. 2 shows schematically the organisation of a program for conducting a network telephone conversation and embodying the present invention.

As has been described above, an application manager AM 4 such as Microsoft® NetMeeting™ may be used to allow a computer operator to take part in a network telephone conversation. FIG. 2 illustrates an embodiment of the present invention which allows the same AM 4 to be used in conjunction with an externally connected mobile telephone 11 which can be selected to replace the microphone 2, loudspeaker 3, and soundcard 1 previously used. The audio compression manager (ACM) 7 is replaced with a custom data transfer manager (DTM) 12 and a custom phone driver (CPD) 13. This replacement is achieved, for example, by the user deselecting the ACM 7 and selecting the DTM 12 (and the CPD 13) through the AM 4 or using a system specific method (e.g. the Control Panel in Windows™).

The mobile telephone 11 is typically coupled to the computer via an RS-232 serial connection 14 using a cable, RF, or infra-red link. Of course, any other suitable interface protocol and link may be used instead. It will be appreciated that the telephone 11 is provided internally with an audio codec which transforms sounds received at the microphone 15 of the telephone into coded, compressed, digital signals. The nature of the coding is generally determined by the cellular network in which the telephone operates. Examples of digital systems are GSM (Europe) and CDMA (USA). In the usual operating mode of the telephone, the coded signals are modulated onto an RF carrier signal for transmission through the air. However, with the present invention, the coded signals are output from the phone's codec to the RS-232 connection and are passed to the CPD 13. The CPD 13 in turn passes the coded signals ($I_{pho}$) to the DTM 12. The DTM 12 then passes the coded signals ($O_{net}$) to the AM 4, together with any necessary control data (e.g. flags), from where they are placed on the network 10 via the protocol stack 8 and the network interface 9. Similarly, coded audio signals ($I_{net}$) received over the network 10 are transferred through the DTM 12 ($O_{pho}$) to the telephone 11 where they are decoded by the telephone's codec and subsequently played through the loudspeaker 16 of the telephone 11.

The DTM 12 does not alter the coded audio signals either prior to reception or transmission. It is effectively 'transparent' to these signals which are in a form appropriate for transfer through the AM 4. However, the DTM may generate additional data which would otherwise be generated by the ACM 7, replaced by the DTM 12, in order to keep the AM 4 functioning normally. In particular, the AM 4 expects to couple pcm audio signals ($I_{pcm}$ and $O_{pcm}$) between an ACM 7 and the ADD 6. The DTM 12 therefore reads pcm data transferred from the ADD 6 via the AM 4 in the same way as the ACM 7 would do. However, it then discards this data and instead it returns the compressed audio data received from the phone 11 to the AM 4. When the AM 4 receives compressed audio data from the network 10, it provides this to the DTM 12. The DTM 12 passes the coded data to the CPD 13 but also returns a null audio pcm signal corresponding to 'silence' to the AM 4. This silence signal is then passed to the soundcard 1 through the ADD 6 for playing through the loudspeaker 3. Of course the user hears nothing from the loudspeaker 3.

Figure 3A:
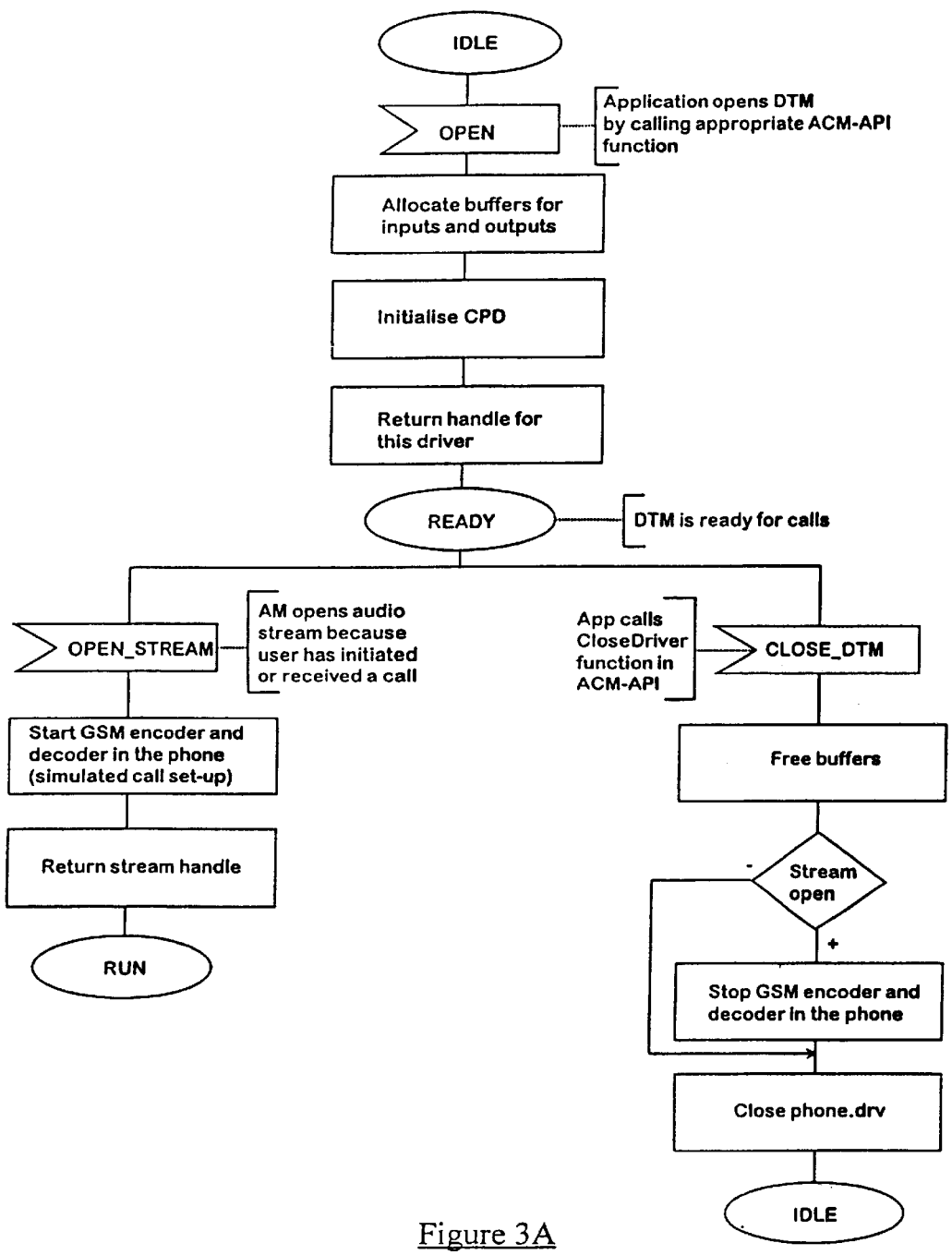
FIGS. 3A and 3B are state diagrams illustrating a method of operating a computer to conduct a network telephone conversation using a mobile telephone.
Figure 3B:
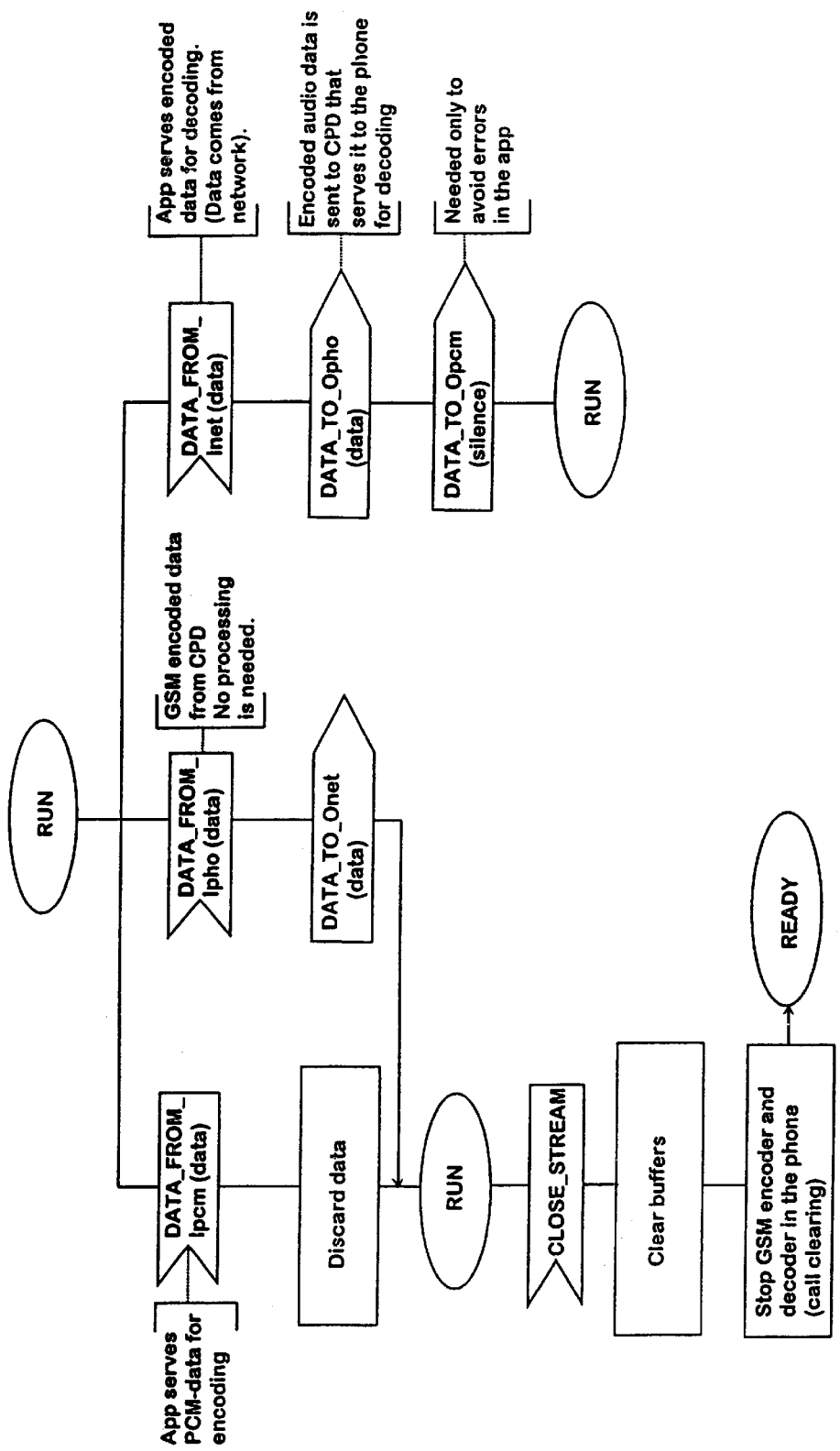

FIG. 3A is a SDL (specification and description language) state diagram showing operations carried out by the AM 4 when a network call is initiated. FIG. 3B shows in more detail the operations performed at the RUN stage. As is shown in FIG. 3A, when the AM initiates a call, it is necessary to start the telephone's codec. This can be done by simulating the phone's call set-up signalling in the computer, and transmitting the signalling to the phone. A similar simulation is carried out when a call is terminated. Alternatively, a 'shadow' call can be created between the communicating parties. This involves setting up a conventional call between the parties over the cellular telephone network. Whilst no audio data is actually transferred via this shadow call, it does have the effect of starting (and stopping) the phone's codec.

From the above discussion, it will be appreciated that there is no need to code the audio signal received from the telephone 11 before the AM 4 transfers the signal to the network 10 and similarly there is no need to decode data received from network 10 before transmitting that data to the telephone 11. Normally, coding and decoding of data by the ACM 7 involves a considerable amount of the computation on the part of the host computer. The embodiment described above transfers this computation from the computer to the mobile telephone where a dedicated digital signal processor (DSP) is easily able to perform the codec function. In many multimedia applications, this transfer is of great significance, freeing the computer's processor for other operations.

It will be appreciated by the skilled person that modifications may be made to the above described embodiment without departing from the scope of the present invention. For example, the DTM may provide for a 'hands-free' operation mode where coded audio data recieved from the network is decoded by the DTM and transferred via the AM and the ADD to the loudspeaker 3. The phone 11 is still used to provide coded audio data to the DTM for transmission over the network whilst the microphone 2 remains effectively disabled due to the DTM discarding audio data received from the microphone. Optionally, received coded audio data may or may not be routed to the phone 11 for playing through the phone's loudspeaker 16.

In a further modification, the audio data is transferred between the phone and the DTM in an uncompressed form. Means may be provided for disabling the phone's codes in order to facilitate this transfer.

What is claimed is:

1. A method of conducting real-time telephone conversation using a computer, the method comprising:
   connecting a mobile telephone device comprising an audio codec to the computer;
   receiving a compressed audio signal representing the telephone conversation over an external data transfer channel to the computer;
   providing the compressed audio signal representing the telephone conversation from the computer to the mobile telephone device; and
   decompressing the compressed audio signal representing the telephone conversation using the audio codec in the mobile telephone device to obtain an uncompressed audio signal representing the telephone conversation.

2. A method according to claim 1, wherein the mobile telephone device further comprises an earpiece, the method further comprising laying the uncompressed audio signal representing the telephone conversation through the earpiece of the mobile telephone device.

3. A method according to claim 2, the computer comprising a loudspeaker, sound control hardware, an audio device driver for driving the sound control hardware, an application manager and an audio compression manger, the application manager for interfacing the audio device driver with the audio compression manager and for interfacing the audio compression manager with the external data transfer channel, the audio compression manager for receiving a compressed audio signal representing the telephone conversation from the external data transfer channel via the application manager and for decompressing the compressed audio signal representing the telephone conversation to obtain an uncompressed audio signal representing the telephone conversation and for providing the uncompressed audio signal via the application manager arid audio device driver to the sound control hardware for playing said uncompressed audio signal through the loudspeaker of the computer, wherein the method further comprises:
   providing the computer with a data transfer manager for use in place of said audio compression manager, the data transfer manager for receiving a compressed audio signal representing a telephone conversation from the external data transfer channel via the application manager and for providing the compressed audio signal representing the telephone conversation to the mobile telephone device connected to the computer.

4. A method according to claim 3, wherein the method further comprises selecting the data transfer manager for use in place of the audio compression manager.

5. A method according to claim 3, the method further comprising providing the uncompressed audio signal representing the telephone conversation from the data transfer manager to the sound control hardware and playing the uncompressed audio signal using the sound control hardware and the loudspeaker of the computer.

6. A method according to claim 1, further comprising providing a custom driver for interfacing the mobile telephone device with the computer.

7. A method according to claim 3, wherein the data transfer manager converts the compressed audio signal representing, the telephone conversation between a first format and a second format.

8. A method according to claim 7, wherein the first format is a data format used for data transmission in the external data transfer channel and the second format is a data format used by the mobile telephone device.

9. A method according to claim 1, wherein the mobile telephone device is connected to the computer over a link selected from a group consisting of: an infrared link, a radio link and a wired connection.

10. A method according to claim 1, further comprising simulating a phone call set-up in order to activate the audio codec of the mobile telephone device.

11. A method of conducting a real-time telephone conversation using a computer, the computer having means for communicating over an external data transfer channel, the method comprising:
   connecting a mobile telephone device comprising an audio codec to the computer;
   inputting an audio signal representing a telephone conversation into the mobile telephone device;
   compressing he audio signal using the audio codec of the mobile telephone device to obtain a compressed audio signal representing the telephone conversation;
   providing the compressed audio signal representing the telephone conversation to the computer;

receiving the compressed audio signal representing the telephone conversation at the computer; and sending the compressed audio signal representing the telephone conversation from the computer over the external data transfer channel.

12. A method according to claim 11, wherein the audio signal representing the telephone conversation is received into the mobile telephone device by a microphone of the mobile telephone device.

13. A method according to claim 12, the computer comprising a microphone, sound control hardware, an audio device driver for driving the sound control hardware, an application manager and an audio compression manger, the application manager for interfacing the audio device driver with the audio compression manager and for interfacing the audio compression manager with the external data transfer channel, the audio compression manager for receiving an audio signal representing a telephone conversation from the microphone of the computer via the audio device driver and the application manager and for compressing the audio signal to obtain compressed audio signal representing the telephone conversation and for providing the compressed audio signal representing the telephone conversation via the application manager to the external data transfer channel, wherein the method further comprises:

providing the computer with a data transfer manager for use in place of said audio compression manager, the data transfer manager for receiving a compressed audio signal representing a telephone conversation from the mobile telephone device connected to the computer and for providing the compresses audio signal representing the telephone conversation to the external data transfer channel via the application manager.

14. A method according to claim 13, the method further comprises selecting the data transfer manager for use in place of the audio compression manager.

15. A method according to claim 13, further comprising providing a custom driver for interfacing the mobile telephone device with the computer.

16. A method according to claim 13, wherein the data transfer manager converts the compressed audio signal representing the telephone conversation between a first format and a second format.

17. A method according to claim 16, wherein the first format is a data format used by he mobile telephone device and the second format is a data format for data transmission in the external data transfer channel.

18. A method according to claim 11, wherein the mobile telephone device is connected to the computer over a link selected from a group consisting of: an infrared link, a radio link and a wired connection.

19. A method according to claim 11, the method further comprising simulating a phone call set up in order to activate the audio codec of the mobile telephone device.

20. A method conducting a real time telephone conversation using a computer, the method comprising:

connecting a mobile telephone device comprising an audio codec to the computer;

inputting an audio signal into the mobile telephone device;

compressing the audio signal using the audio codec of the mobile telephone device to obtain a compressed audio signal representing the telephone conversation;

providing the compressed audio signal representing the telephone conversation to the computer via a data transfer manager in the computer, the computer having means for communicating over an external data transfer channel; and sending the compressed audio signal representing the telephone conversation from the computer over the external data transfer channel;

the method further comprising:

receiving a compressed audio signal representing the telephone conversation over the external data transfer channel to the computer;

providing the compressed audio signal representing the telephone conversation from the computer to the mobile telephone device via the data transfer in the computer; and decompressing the compressed audio signal representing the telephone conversation using the audio codec in the mobile communication device.

21. A method according to claim 20, the computer comprising a loudspeaker and a microphone, sound control hardware, an audio device driver for driving the sound control hardware, an application manager and an audio compression manger, the application manager for interfacing the audio device driver with the audio compression manager and for interfacing the audio compression manager with the external data transfer channel, the audio compression manager for receiving a compressed audio signal representing the telephone conversation from the external data transfer channel via the application manager and for decompressing the co pressed audio signal representing the telephone conversation to obtain an uncompressed audio signal representing the telephone conversation and for providing the uncompressed audio signal via the application manager and audio device driver to the sound control hardware for playing said uncompressed audio signal through the loudspeaker of the computer, the audio compression manager further for receiving an audio signal representing a telephone conversation from the microphone of the computer via the audio device driver and the application manager and for compressing the signal to obtain a compresses audio signal representing the telephone conversation and for providing the compressed audio signal representing the telephone conversation via the application manager to the external data transfer channel, wherein the method further comprises:

providing the computer with a data transfer manager for use in place of said audio compression manager, the data transfer manager for receiving a compressed audio signal representing a telephone conversation from the external data transfer channel via the application manager and for providing the compressed audio signal representing the telephone conversation to the mobile telephone device connected to the computer and further for receiving a compressed audio signal representing a telephone conversation from the mobile telephone device connected to the computer and for providing the compressed audio signal representing the telephone conversation to the external data transfer channel via the application manager.

22. A method according to claim 21, wherein the method further comprises selecting the data transfer manager for use in place of the audio compressing manager.

23. A mobile telephone device comprising;

means for coupling the mobile telephone device with a computer;

means for receiving a compressed audio signal representing a real-time telephone conversation from the computer over the coupling; and an audio codec for decompressing the compressed audio signal representing the real-time telephone conversation to obtain an uncompressed audio signal representing the real-time telephone conversation.

24. A mobile telephone device according to claim 23, further comprising means for activating the audio codec for decompressing the compressed audio signal representing the telephone conversation received over the coupling.

25. A mobile telephone device according to claim 23, further comprising means for providing the uncompressed audio signal representing the telephone conversation to a computer after decompression.

26. A mobile telephone device comprising:
   a microphone for receiving an audio signal;
   an audio codec for compressing the audio signal to obtain a compressed audio signal representing a real-time telephone conversation;
   means for coupling the mobile communication device with a computer; and
   means for providing the computer with the compressed audio signal representing the real-time telephone conversation.

27. A communication system comprising a computer and a mobile telephone device, the computer comprising:
   means for receiving a compressed audio signal representing a real-time telephone conversation over an external data transfer channel;
   means for providing the compressed audio signal representing the real-time telephone conversation to the mobile telephone device;
   the mobile telephone device comprising:
      means for coupling the mobile telephone device with the computer;
      means for receiving the compressed audio signal representing the real-time telephone conversation from the computer;
      an audio codec for decompressing the compressed audio signal representing for telephone conversation; and
      means for activating the audio codec for decompressing the compressed audio signal representing the real-time telephone conversation.

28. A communication system comprising a mobile telephone device and a computer, the mobile telephone device comprising:
   a microphone for receiving an audio signal representing a real-time telephone conversation;
   an audio codec for compressing the audio signal representing a compresses audio signal representing a real-time telephone conversation;
   means for activating the audio codec for compressing the audio signal;
   means for coupling the mobile telephone device with the computer;
   means for providing the computer with the compressed audio signal representing the real-time telephone conversation:
   the computer comprising:
      means for receiving the compresses audio signal representing the real-time telephone conversation from the mobile telephone device;
      means for sending the compressed audio signal representing the real-time telephone conversation over an external data transfer channel.

29. A communication system comprising a mobile telephone device and a computer, the computer comprising:
   means for receiving a compressed audio signal representing a real-time telephone conversation over an external data transfer channel; and
   means for providing the compressed audio signal representing the real-time telephone conversation to the mobile telephone device;
   the mobile telephone device comprising:
      means or coupling the mobile telephone device with the computer;
      means for receiving the compressed audio signal representing the real-time telephone conversation from the computer;
      an audio codec for decompressing the compressed audio signal representing the real-time telephone conversation; and
      means for activating the audio codec for decompressing the compressed audio signal representing the real-time telephone conversation.

* * * * *